US008610927B2

(12) United States Patent
Sweet et al.

(10) Patent No.: US 8,610,927 B2
(45) Date of Patent: Dec. 17, 2013

(54) WALK-UP PRINTING WITHOUT DRIVERS

(75) Inventors: Michael R. Sweet, Morgan Hill, CA (US); Howard A. Miller, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 12/882,107

(22) Filed: Sep. 14, 2010

(65) Prior Publication Data
US 2011/0194140 A1 Aug. 11, 2011

Related U.S. Application Data

(60) Provisional application No. 61/302,916, filed on Feb. 9, 2010, provisional application No. 61/351,461, filed on Jun. 4, 2010, provisional application No. 61/378,832, filed on Aug. 31, 2010, provisional application No. 61/302,922, filed on Feb. 9, 2010, provisional application No. 61/351,466, filed on Jun. 4, 2010, provisional application No. 61/358,306, filed on Jun. 24, 2010, provisional application No. 61/378,827, filed on Aug. 31, 2010.

(51) Int. Cl.
*G06F 3/12* (2006.01)
(52) U.S. Cl.
USPC ......... 358/1.15; 358/1.2; 358/1.13; 358/1.16; 358/2.1; 709/202; 709/203; 709/209; 709/211; 709/224; 709/226
(58) Field of Classification Search
None
See application file for complete search history.

(56) References Cited

U.S. PATENT DOCUMENTS

| 5,287,194 A | 2/1994 | Lobiondo |
| 5,768,483 A | 6/1998 | Maniwa |
| 6,268,927 B1 | 7/2001 | Lo |

(Continued)

FOREIGN PATENT DOCUMENTS

| CN | 1217503 A | 5/1999 |
| CN | 1525305 A | 9/2004 |
| CN | 1537298 A | 10/2004 |
| EP | 1450515 A2 | 8/2004 |
| EP | 1818805 A2 | 8/2007 |

(Continued)

OTHER PUBLICATIONS

International Search Report and Written Opinion received in corresponding PCT Application No. PCT/US2013/024006 dated Apr. 25, 2013.

(Continued)

*Primary Examiner* — Miya J Cato
(74) *Attorney, Agent, or Firm* — Wong, Cabello, Lutsch, Rutherford & Brucculeri, LLP

(57) ABSTRACT

The disclosed embodiments provide a system that supports printing from a computing device. During operation, the system uses a discovery protocol to identify printers that can be accessed by the computing device. Next, the system receives a selection of a printer that can be accessed by the computing device. The system then generates printer data for the print job. This can be accomplished in a number of ways. The system can use a driverless printing technique, which involves obtaining printer capability information from the selected printer and generating printer data for the selected printer based on the printer capability information. Alternatively, the system can use a printer-specific driver for the selected printer to generate the printer data. The system can also send the print job to a cloud, which includes one or more servers that provide a printing service, so that the cloud can generate the printer data. Finally, the system sends the generated printer data to the printer.

22 Claims, 5 Drawing Sheets

(56) References Cited

U.S. PATENT DOCUMENTS

| | | |
|---|---|---|
| 6,549,654 B1 | 4/2003 | Kumada |
| 2002/0078149 A1 | 6/2002 | Chang |
| 2002/0138564 A1* | 9/2002 | Treptow et al. ............... 709/203 |
| 2003/0063309 A1 | 4/2003 | Parry |
| 2004/0239986 A1* | 12/2004 | Wise ........................... 358/1.15 |
| 2005/0046886 A1 | 3/2005 | Ferlitsch |
| 2005/0050013 A1 | 3/2005 | Ferlitsch |
| 2007/0127063 A1* | 6/2007 | Fertlitsch et al. ............ 358/1.15 |
| 2007/0177192 A1* | 8/2007 | Wang ........................... 358/1.15 |
| 2007/0182993 A1 | 8/2007 | Yamada |
| 2008/0112013 A1 | 5/2008 | Ferlitsch |
| 2008/0180699 A1* | 7/2008 | Selvaraj ......................... 358/1.1 |
| 2009/0059272 A1 | 3/2009 | Matsushita |
| 2011/0194123 A1* | 8/2011 | Sweet et al. .................. 358/1.2 |
| 2011/0194124 A1* | 8/2011 | Sweet et al. .................. 358/1.2 |
| 2011/0194140 A1 | 8/2011 | Sweet |
| 2011/0194141 A1* | 8/2011 | Sweet et al. ................ 358/1.15 |

FOREIGN PATENT DOCUMENTS

| | | |
|---|---|---|
| EP | 1953642 A2 | 8/2008 |
| EP | 1973031 A1 | 9/2008 |
| JP | 11053142 A | 2/1999 |
| WO | 2011100148 A1 | 8/2011 |

OTHER PUBLICATIONS

First Office Action received in corresponding CN Application No. 201110034714.0, dated May 24, 2013.

First Office Action received in corresponding CN Application No. 201110034596.3 dated Apr. 2, 2013 with translation.

International Search Report and Written Opinion received in corresponding PCT Application No. PCT/US2013/024031 dated Apr. 17, 2013.

Search Report and Written Opinion received in corresponding PCT Application No. PCT/US2011/023475, dated Mar. 25, 2011.

* cited by examiner

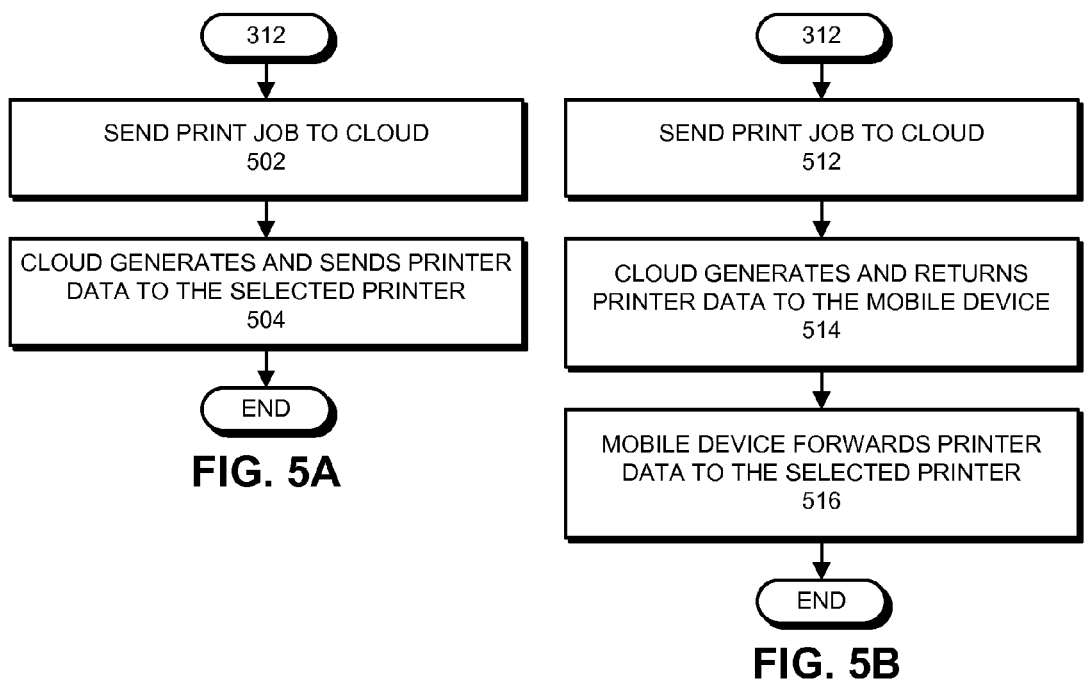

WALK-UP PRINTING WITHOUT DRIVERS

RELATED APPLICATIONS

This application claims priority under 35 U.S.C. §119 to U.S. Provisional Patent Application No. 61/302,916 filed 9 Feb. 2010, entitled "Walk-Up Printing without Drivers" by the same inventors as the instant application. This application also claims priority under 35 U.S.C. §119 to U.S. Provisional Patent Application No. 61/351,461 filed 4 Jun. 2010, entitled "Walk-Up Printing without Drivers" by the same inventors as the instant application. This application also claims priority under 35 U.S.C. §119 to U.S. Provisional Patent Application No. 61/378,832 filed 31 Aug. 2010, entitled "Walk-Up Printing without Drivers" by the same inventors as the instant application. This application also claims priority under 35 U.S.C. §119 to U.S. Provisional Patent Application No. 61/302,922 filed 9 Feb. 2010, entitled "Framework that Supports Driverless Printing" by the same inventors as the instant. This application also claims priority under 35 U.S.C. §119 to U.S. Provisional Patent Application No. 61/351,466 filed 4 Jun. 2010, entitled "Framework that Supports Driverless Printing" by the same inventors as the instant application. This application also claims priority under 35 U.S.C. §119 to U.S. Provisional Patent Application No. 61/358,306 filed 24 Jun. 2010, entitled "Framework that Supports Driverless Printing" by the same inventors as the instant application. This application also claims priority under 35 U.S.C. §119 to U.S. Provisional Patent Application No. 61/378,827 filed 31 Aug. 2010, entitled "Framework that Supports Driverless Printing" by the same inventors as the instant application.

This application is related to pending U.S. patent application Ser. No. 12/882,116, filed on the same day as the instant application, entitled "Framework that Supports Driverless Printing" by the same inventors as the instant application. This application is also related to pending U.S. patent application Ser. No. 12/882,124, filed on the same day as the instant application, entitled "Printer that Supports Driverless Printing" by the same inventors as the instant application. This application is also related to pending U.S. patent application Ser. No. 12/882,134 filed on the same day as the instant application, entitled "Data Formats to Support Driverless Printing" by the same inventors as the instant application.

BACKGROUND

1. Field

The disclosed embodiments relate to printers for computer systems. More specifically, the disclosed embodiments relate to a computer-based printing system that operates without having to generate and maintain printer-specific driver software.

2. Related Art

Printers are often a problem for computer users. When a computer user initially installs a printer, the cabling and power cords are typically not a problem to hook up. However, the user typically has to install a printer-specific driver, which involves loading the driver from a disk or navigating to a website and downloading the driver. Even if the printer driver is already loaded into the computer system, the user typically has to load and install an update for the driver from the printer manufacturer's website. These installation operations are time-consuming and commonly require the user to find and enter a long software-license key.

Printers pose an even bigger problem for users of mobile computing devices, such as laptops or smart phones. In practice, the wireless computing device may not be configured with the requisite driver software. In this case, installing the appropriate printer driver can be bothersome, especially if the user of the mobile computing device only intends to use the nearby printer once or twice. Also, mobile computing devices have limited storage space, which makes it impractical for them to store a large number of printer drivers.

Hence, what is needed is a system that facilitates printing from a computing device to a nearby printer without the above-described problems.

SUMMARY

The disclosed embodiments provide a system that supports printing from a computing device (e.g., a mobile computing device). During operation, the system first uses a discovery protocol to identify printers that can be accessed by the computing device. Next, the system receives a selection of a printer that can be accessed by the computing device. The system then obtains printer capability information from the selected printer and generates printer data for a print job based on the selected printer capability information. Finally, the system sends the generated printer data to the selected printer.

In some embodiments, the printer capability information includes current printer status information for the selected printer. For example, the current status information can specify: whether the selected printer is off-line; whether the selected printer is busy; or whether an error condition exists in the selected printer.

In some embodiments, obtaining the printer capability information involves querying the selected printer again to obtain the printer capability information.

In some embodiments, obtaining the printer capability information involves obtaining the printer capability information from the printer during the discovery protocol.

In some embodiments, if the computing device contains a specific driver for the selected printer, instead of obtaining printer capability and generating printer data based on the obtained capability information, the system uses the specific driver to generate printer data for the selected printer.

In some embodiments, instead of obtaining printer capability and generating printer data based on the obtained capability information, the system sends the print job to a cloud containing one or more servers that provide a printing service. This enables the one or more servers to generate printer data for the selected printer.

In some embodiments, the one or more servers send the printer data directly to the selected printer.

In some embodiments, the one or more servers send the printer data to the computing device so that the computing device can forward the printer data to the selected printer.

In some embodiments, while generating the printer data for the print job, the system reduces the file size for the printer data.

In some embodiments, while generating the printer data for the print job, the system reduces the number of computational operations required to generate the printer data, thereby extending battery life for the computing device.

In some embodiments, the system includes: a discovery component configured to perform the discovery protocol and to facilitate selection of an accessible printer; a network-printing component configured to transport printer data to the selected printer; and a page-description-language component configured to generate printer data for the selected printer based on obtained capability information for the selected printer. In these embodiments, the system provides an integrated framework that enables the discovery component, the network-printing component and the page-description-language component to be accessed by an application.

In some embodiments, this integrated framework includes one or more application programming interfaces (APIs) that provide access to the discovery component, the network-printing component and/or the page-description-language component. This API enables a calling application to interact with other application code being called through the API. Various function calls, messages or other types of invocations, which may further include various kinds of parameters, can be transferred via the API between the calling application and the code being called. In addition, the API may enable the calling application code to use data types or classes defined in the API and implemented in the called application code. A method for operating through this API includes transferring one or more function calls, messages, other types of invocations or parameters via the API.

BRIEF DESCRIPTION OF THE FIGURES

FIG. 5A presents a flow chart illustrating how cloud printing operates in accordance with the disclosed embodiments.

FIG. 5B presents a flow chart illustrating an alternative technique for performing cloud printing in accordance with the disclosed embodiments.

DETAILED DESCRIPTION

Figure 1:
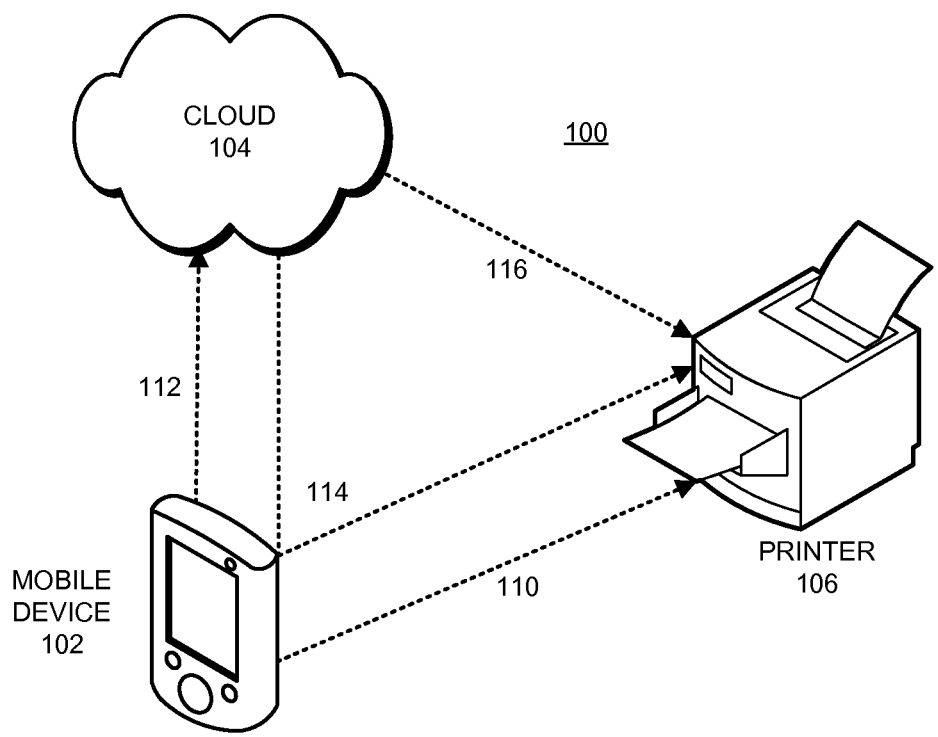
FIG. 1 illustrates a printing system in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Walk-Up Printing

The disclosed embodiments facilitate "walk-up printing," which enables a user of a device (e.g., a mobile computing device) to print to a nearby printer without having to worry about installing or updating associated printer driver software. This can be accomplished by augmenting a discovery protocol (such as Bonjour™) and an associated network-printing protocol (such as IPP), so that the protocols return printer capability information which is used to generate printer data for a selected printer.

Note that the disclosed embodiments differ from existing systems which need to maintain specific drivers for each supported printer. In these existing systems, the features and capabilities for specific printers are stored in static capability files created by the printer vendors, such as a PostScript Printer Description (PPD) file, and these static capability files are stored on the device itself. In contrast, the disclosed embodiments query a printer (not a static file) to determine the "current" operational capabilities of a printer. In addition to the discovery protocol and the network-printing protocol, the disclosed embodiments also can provide a page-description language that specifies the appearance of printed pages.

The disclosed embodiments additionally provide a framework which enables an application to easily use the discovery protocol, the network-printing protocol and the page-description language. This framework can be implemented as one or more APIs which enable an application to access these components.

Details of the disclosed embodiments are described below, but first we describe the printing system.

Printing System

FIG. 1 illustrates a printing system 100 in accordance with the disclosed embodiments. Printing system 100 includes a number of entities, including a device 102 (e.g., a mobile device 102), a cloud 104 and a printer 106. In one embodiment, mobile device 102 can generally include any type of mobile computer system or computing device, such as a laptop computer, a notebook computer, a tablet computer, a personal digital assistant, a digital media receiver (such as Apple TV™), a digital picture frame, a cellular telephone or a portable navigation system. Printer 106 can generally include any device or system capable of printing textual data or images onto some type of print media, such as paper or photo media. For example, printer 106 can comprise a stand-alone printer, or alternatively a printing system, which includes a print server and one or more printers.

Cloud 104 can include one or more servers that provide printing services using a cloud-computing paradigm. For example, cloud 104 can include a server which receives a print job from mobile device 102 and generates corresponding printer data which can be printed by printer 106. Note that a system which implements a cloud-computing paradigm provides a layer of abstraction between a computing resource and the resource's underlying technical architecture (e.g., servers, storage, networks). This facilitates convenient, on-demand network access to a shared pool of configurable computing resources that can be rapidly provisioned and released with minimal management effort or service-provider interaction. Clouds typically have five characteristics: on-demand self-service, broad network access, resource pooling, rapid elasticity, and measured service.

The entities illustrated in FIG. 1 are coupled together by one or more networks (not shown). These networks can generally include any type of communication channel capable of coupling together network nodes. For example, the one or more networks can include a wireless network connection, such as a Bluetooth™ network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

During the printing process, mobile device 102 initially makes contact with printer 106 through a discovery protocol as is described in more detail below. Next, after printer 106 is identified and selected, there are a number of ways that printing can be accomplished. If mobile device 102 possesses a driver for printer 106, or if printer 106 supports driverless printing, mobile device 102 can use the driver or the driverless printing technique to generate printer data for a print job and can send the printer data directly to printer 106 (as is illustrated by dashed arrow 110). This process is described in more detail below. (Note that the term "driverless printing" refers to a printing technique which operates without the need for printer-specific software on a computing device. Instead, the computing device queries a printer to obtain capability information for the printer (including current-status information) and generates printer data for the printer based on the obtained printer capability information.)

On the other hand, if mobile device 102 does not possess a driver for printer 106 and if printer 106 does not support driverless printing, mobile device 102 can send the print job to a cloud 104 (illustrated by dashed arrow 112). Next, one or more servers within cloud 104 can process the print job to generate printer data and can send the printer data directly to printer 106 (illustrated by dashed arrow 116). Alternatively, cloud 104 can return the printer data to mobile device 102, so that mobile device 102 can forward the printer data to printer 106 (illustrated by dashed arrow 114).

Printing Components

Figure 2:
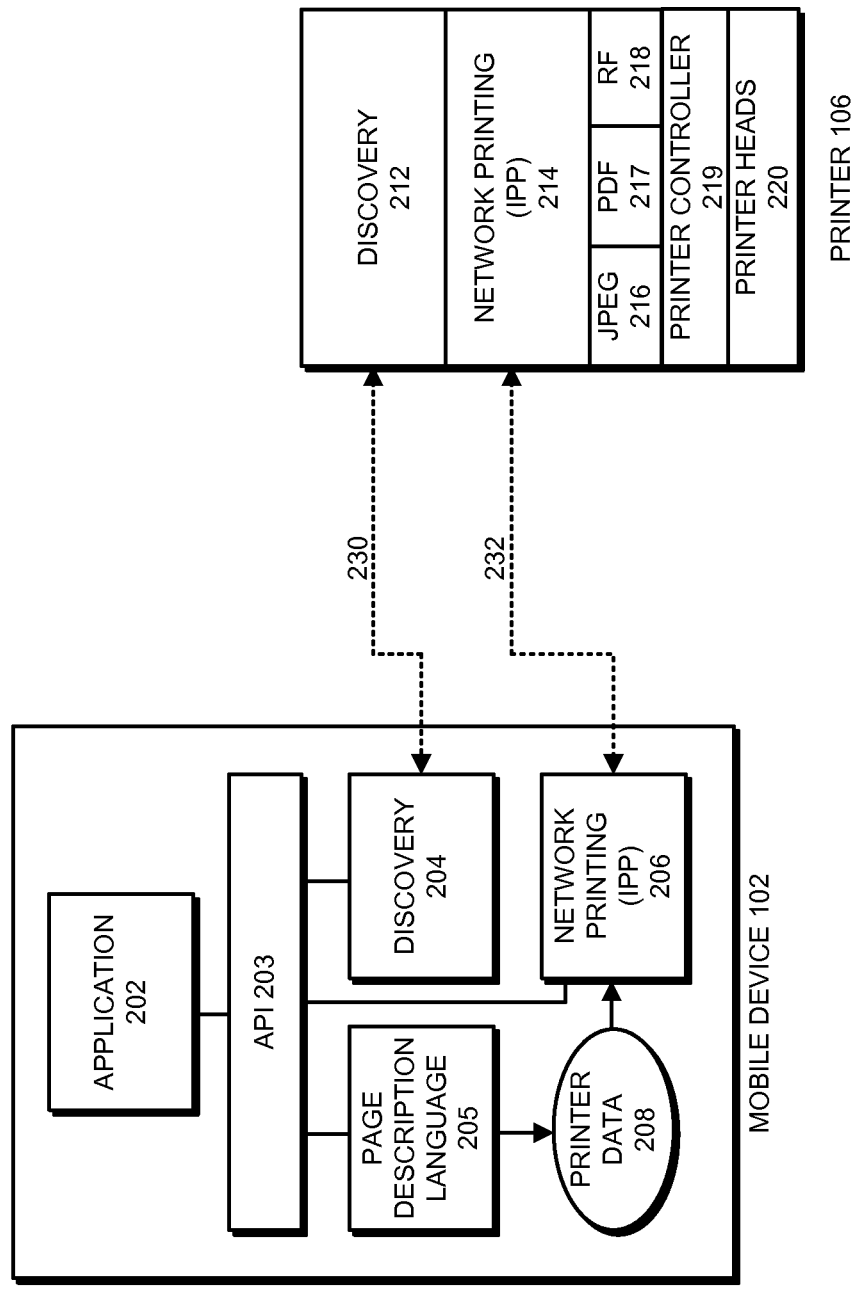
FIG. 2 illustrates components involved in performing a printing operation in accordance with the disclosed embodiments.

FIG. 2 illustrates components involved in performing a printing operation in accordance with the disclosed embodiments. Referring to FIG. 2, mobile device 102 includes an application 202 which needs to perform a printing operation. For example, application 202 can include a printing utility that allows a user to print a specific file. Alternatively, application 202 can include any type of general-purpose or special-purpose computer-based application that periodically needs to perform a printing operation, such as a word processor. Application 202 makes calls to API 203, which provides a framework that facilitates access to a number of components, including a discovery component 204, a page-description-language component 205 and a network-printing component 206.

During operation, application 202 uses discovery component 204, which implements a discovery protocol (such as Bonjour™) to identify available printers and to facilitate selecting one of the identified printers. Note that discovery component 204 communicates with a corresponding discovery component 212 in printer 106 (illustrated by dashed line 230). Next, after a printer 106 is selected, application 202 uses page-description-language component 205 to render a print job to produce corresponding printer data 208. Printer data 208 is then sent to network-printing component 206, which implements a network protocol for remote printing, such as an Internet Printing Protocol (IPP). Network-printing component 206 communicates printer data 208 to a corresponding network-printing component 214 within printer 106 (illustrated by dashed line 232).

As mentioned above, printer 106 contains a discovery component 212 and a network-printing component 214. In addition, printer 106 includes components that support printing using: the JPEG (Joint Photographic Experts Group) standard 216, the PDF (Portable Document Format) standard 217, and a RF (Raster Format) standard 218. These components send data to through printer controller 219 to print heads 220 within printer 104, so that print controller 219 can translate the data and print heads 220 can print the translated data onto some type of print media, such as paper.

Printing Process

Figure 3:
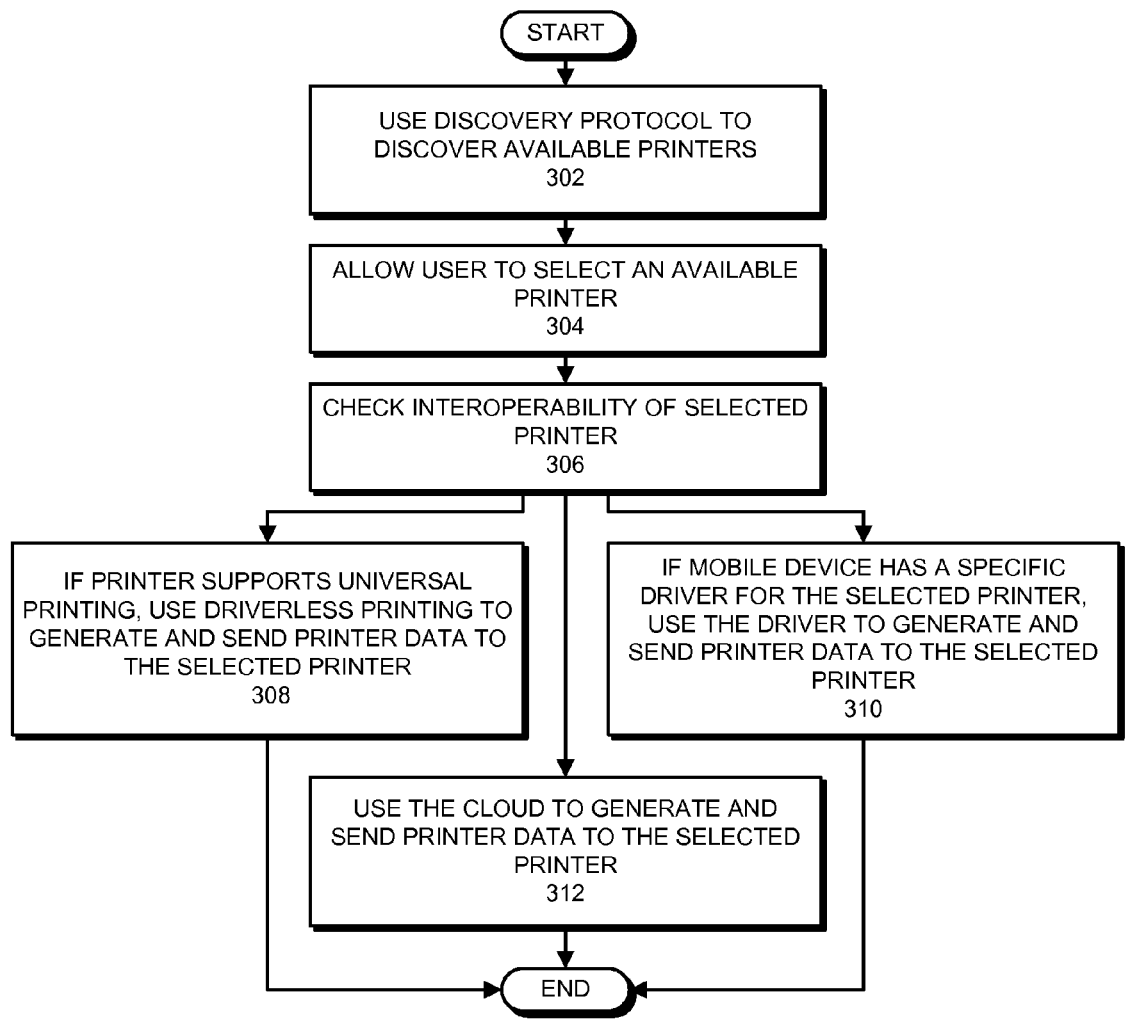
FIG. 3 presents a flow chart illustrating the printing process in accordance with the disclosed embodiments.

FIG. 3 presents a flow chart illustrating the printing process in accordance with the disclosed embodiments. First, the system uses a discovery protocol, such as the Bonjour™ protocol, to identify printers that can be accessed by mobile device 102 (step 302). As mentioned above, this discovery protocol also obtains capability information from the printer. Next, the system presents a list of available printers to a user (or an application) and allows the user (or the application) to select one of the identified printers (step 304).

Next, the system checks interoperability of the selected printer (step 306). For example, the system can obtain information from the printer indicating that the printer supports JPEG, PDF and RF, in which case the system can use any of the supported formats. On the other hand, if the information indicates the printer can only support RF, the system uses RF to send data to the printer.

Next, the system has a number of options. If the selected printer supports driverless printing, the system can obtain printer capability information from the selected printer and can generate printer data for the printer based on the obtained printer capability information. Next, the system can send the generated printer data to the selected printer (step 308). As mentioned above, this capability information can be obtained from the selected printer during a query for the discovery protocol, or during a subsequent network-printing protocol query. On the other hand, if the mobile device contains a specific driver for the selected printer, the system can use the specific driver to generate and send printer data to the selected printer (step 310). The system can alternatively send the print job to a cloud comprising one or more servers that provide a printing service. This enables the cloud to generate and the printer data for the selected printer (step 312).

In general, the system can select between driverless printing, cloud printing and using a local driver based on a number of factors, such as power consumption and/or computational load. In one embodiment, the system uses driverless printing if possible, and if driverless printing is not supported, the system uses a local driver for the printer. Finally, if such a local driver is not supported, the system uses the cloud to generate the printer data.

Printer Capability Information

As mentioned above, the printer capability information can be obtained from the selected printer during a query for the discovery protocol (Bonjour™), or during a subsequent network-printing protocol (IPP) query. More specifically, during the discovery protocol, the printer can return printer-specific information specifying what types of data the printer can accept and information specifying the printer's capabilities. Once the mobile device is actually communicating with the printer through IPP, the IPP protocol can provide the same printer-specific information. (This prevents having to cache information between the discovery protocol and the network-printing protocol.)

This printer capability information can specify attributes of the print media, such as media sizes, types (e.g., paper or photo media) and margins. This printer capability information can also specify finishing attributes, such as attributes related to stapling, hole punching and booklets. The printer capability information can additionally specify information related to printer features, such as whether to print on two sides of a page (duplex), which output bit to use, and which media source (tray) to use. The printer capability attributes can also specify file-related attributes, such as the file sizes supported by the printer, the file-format versions supported by the printer, and the file-format extensions supported by the printer. The printer capability information can also specify various printer capabilities, such as the color spaces supported by the printer, the bit depths supported by the printer, and the resolutions supported by the printer.

This printer capability information can additionally specify current status information obtained from printers. For example, this current status information can specify: whether the printer is off-line; whether the printer is busy; or whether an error condition exists in the printer. This current status information can be presented to the user while the user is selecting an available printer.

Driverless Printing

Figure 4:
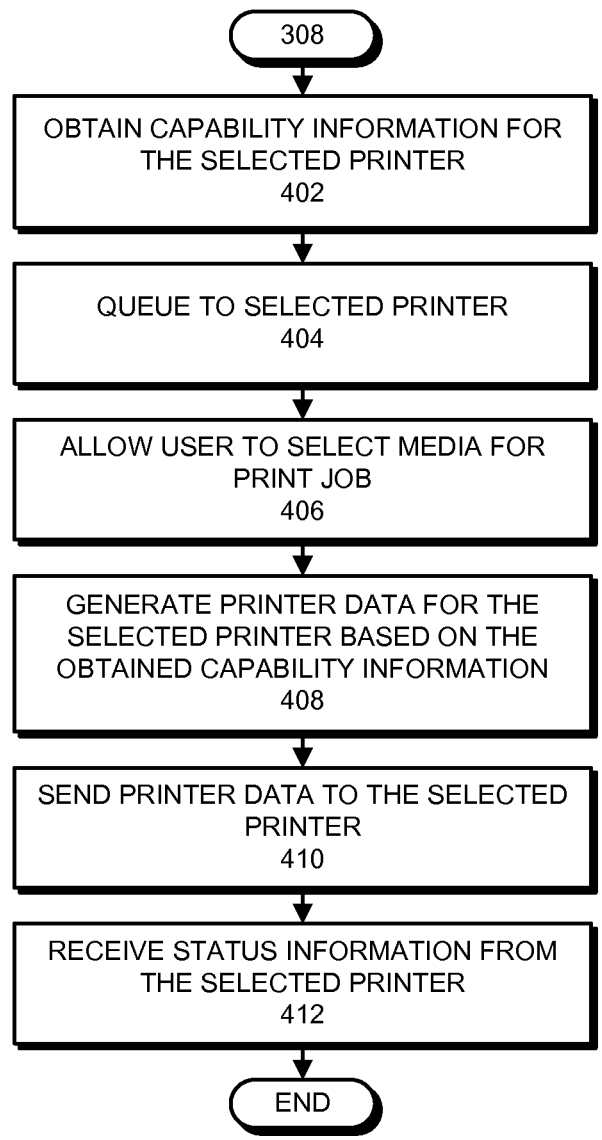
FIG. 4 presents a flow chart illustrating the driverless printing process in accordance with the disclosed embodiments.

FIG. 4 presents a flow chart illustrating the driverless printing process in accordance with the disclosed embodiments. (This flow chart illustrates some of the operations which take place during the driverless printing process which occurs in step 308 of FIG. 3.) First, the system obtains capability information for the selected printer (step 402). As mentioned above, this capability information can be obtained from the printer during a query which is part of the initial discovery protocol, or during a subsequent IPP query. Next, the system queues the selected printer (step 404) and allows a user (or an application) to select a specific type of media for the print job (step 406).

The system then generates printer data for the selected printer based on the obtained capability information (step 408). The printer then sends the printer data to the selected printer (step 410). Finally, the system receives status information for the selected printer, which indicates whether the printer data was successfully printed (step 412).

Cloud Printing

FIGS. 5A and 5B illustrate flow charts for alternative techniques for cloud printing in accordance with the disclosed embodiments. (These flow charts illustrate operations which take place during the driverless printing process which occurs in step 312 of FIG. 3.) Referring to FIG. 5A, mobile device 102 first sends a print job to cloud 104 (step 502). Next, a server within cloud 104 generates corresponding printer data for the selected printer and sends the printer data directly to the selected printer (step 504). Unfortunately, this technique may have issues with establishing channels through firewalls. The printer will generally not accept a print job from the cloud unless a channel is first established between a server in the cloud and the printer.

To remedy this problem, the printer data can be returned to the mobile device so that the mobile device can forward the printer data to the printer. More specifically, referring to FIG. 5B, mobile device 102 first sends a print job to cloud 104 (step 512). Next, one or more servers within cloud 104 generate corresponding printer data for the selected printer and return the printer data to mobile device 102 (step 514). Finally, mobile device 102 forwards the printer data to the selected printer (step 516). Because a channel already exists between the mobile computing device and the cloud and between the mobile computing device and the printer, there is no need to set up an additional channel between the cloud and the printer.

Optimizations

In some embodiments, the system can perform optimizations to improve speed, increase print quality and save battery power. This can be accomplished by selecting a file type for the printer data that reduces the number of computational operations involved in generating the printer data, thereby improving speed and reducing the amount of power consumed by the mobile device. For example, if a printer supports PDF and the mobile device is printing a PDF file, it uses much less battery power and is faster to send the PDF file to the printer in comparison to converting the PDF file into raster data and sending the raster data to the printer. (Note that by saving computational operations and computational time, the system frees up resources and time to perform other operations, for example operations that increase print quality.) Also, in the case where the cloud returns the generated printer data to the mobile device, the system can select a file format which reduces the size of the printer data file. This reduces the number of data transfer operations required to forward the printer data to the printer, and thereby improves speed and reduces the amount of power consumed by the mobile device.

In another example, the system can save power by selecting between driverless printing and cloud printing based on whether or not the power consumed while transferring data to and from the cloud will be offset by the power saved by off-loading the printer-related rendering operations to the cloud. By using a cloud, power-consuming computational operations can be off-loaded from a mobile device (that runs on battery power) to a server within a cloud (that runs on wall power), which can potentially save a significant amount of battery power.

Defect Solutions

In some cases, a printer manufacturer may attempt to implement a printer which adheres to the driverless printer specification, but the implementation may have one or more bugs. In this case, the system can maintain a database containing such known bugs for specific printer models. During a printing operation, the system can first perform a lookup in the database, and if one or more known bugs exist for a printer, the system can adjust how the printer data is generated to compensate for these known bugs.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for printing from a computing device, comprising:
    using a discovery protocol to identify printers that can be accessed by the computing device;
    receiving a selection of an identified printer;
    obtaining printer capability information from the selected printer that includes identification of a plurality of print file formats supported by the selected printer;
    selecting a print file format from the plurality of print file formats to optimize the computing device's power consumption for a print job;

generating printer data for the print job based on the selected print file format, wherein the printer capability information enables the computing device to generate the printer data for the selected printer without the need for the computing device to maintain printer-specific software or printer-specific configuration information for the selected printer; and sending the printer data to the selected printer.

2. The method of claim 1, wherein the printer capability information includes current printer status information for the selected printer.

3. The method of claim 2, wherein the current status information specifies one or more of the following:
whether the selected printer is off-line;
whether the selected printer is busy; and
whether an error condition exists in the selected printer.

4. The method of claim 1, wherein the act of selecting a print file format from the plurality of print file formats to optimize the computing device's power consumption for a print job, comprises selecting a print file format that will take the computing device less time to send the printer data to the selected printer than another of the plurality of print file formats.

5. The method of claim 1, wherein the act of selecting a print file format from the plurality of print file formats to optimize the computing device's power consumption for a print job, comprises selecting a print file format that will result in less printer data during the act of generating than another of the plurality of print file formats.

6. The method of claim 1, wherein the act of selecting a print file format from the plurality of print file formats to optimize the computing device's power consumption for a print job, comprises selecting a print file format that will result in the computing device performing fewer computational operations during the act of generating than another of the plurality of print file formats.

7. The method of claim 1, wherein the act of selecting a print file format from the plurality of print file formats to optimize the computing device's power consumption for a print job, comprises:
identifying a print file format from the plurality of print file formats that is also supported by a network-based print server;
determining that use of the network-based print server during the act of generating will consume less power than generating the print data at the computing device; and
selecting the identified print file format.

8. The method of claim 7, wherein the act of generating printer data for the print job based on the selected print file format, comprises:
sending the print job, including identification of the selected print file format, to the network-based print server over a computer network; and
receiving the printer data from the network-based print server over the computer network.

9. A non-transitory computer-readable storage medium storing instructions that when executed by a computer system in a computing device cause the computing device to:
use a discovery protocol to identify printers that can be accessed by the computing device;
receive a selection of an identified printer;
obtain printer capability information from the selected printer, wherein the printer capability information includes identification of a plurality of print file formats supported by the selected printer;
designate a print file format from the plurality of print file formats to optimize the computing device's power consumption for a print job;
generate printer data for the print job based on the selected print file format, wherein the capability information obtained from the selected printer enables the computing device to generate the printer data for the selected printer without the need for the computing device to maintain printer-specific software or printer-specific configuration information for the selected printer; and
send the printer data to the selected printer.

10. The computer-readable storage medium of claim 9, wherein the printer capability information includes current printer status information for the selected printer.

11. The computer-readable storage medium of claim 10, wherein the current status information specifies at least one of the following:
whether the selected printer is off-line;
whether the selected printer is busy; and
whether an error condition exists in the selected printer.

12. The non-transitory computer-readable storage medium of claim 9, wherein the instructions to cause the computing device to select a print file format from the plurality of print file formats to optimize the computing device's power consumption for a print job, comprise instructions to cause the computing device to select a print file format that will take the computing device less time to generate the printer data than another of the plurality of print file formats.

13. The non-transitory computer-readable storage medium of claim 9, wherein the instructions to cause the computing device to select a print file format from the plurality of print file formats to optimize the computing device's power consumption for a print job, comprise instructions to cause the computing device to select a print file format that will result in less printer data than another of the plurality of print file formats.

14. The non-transitory computer-readable storage medium of claim 9, wherein the instructions to cause the computing device to select a print file format from the plurality of print file formats to optimize the computing device's power consumption for a print job, comprise instructions to cause the computing device to select a print file format that will result in the computing device performing fewer computational operations when executing the instructions to generate printer data than another of the plurality of print file formats.

15. The non-transitory computer-readable storage medium of claim 9, wherein the instructions to cause the computing device to select a print file format from the plurality of print file formats to optimize the computing device's power consumption for a print job, comprise instructions to cause the computing device to:
identify a print file format from the plurality of print file formats that is also supported by a network-based print server;
determine that use of the network-based print server to generate printer data will consume less power than generating the printer data at the computing device; and
select the identified print file format.

16. The non-transitory computer-readable storage medium of claim 15, wherein the instructions to cause the computing device to generate printer data for the print job based on the selected print file format, comprise instructions to cause the computing device to:
send the print job, including identification of the selected print file format, to the network-based print server over a computer network; and receive the printer data from the network-based print server over the computer network.

17. A system for printing from a computing device, comprising:
a discovery component configured to,
identify printers that can be accessed by the computing device,
receive a selection of an identified printer,
obtain printer capability information from the selected printer, wherein the printer capability information includes identification of a plurality of print file formats supported by the selected printer, and;
select a print file format from the plurality of print file formats to optimize the computing device's power consumption for a print job; and
a printing component configured to,
generate printer data for the print job based on the selected print file format, wherein the capability information obtained from the selected printer enables the computing device to generate the printer data for the selected printer without the need for the computing device to maintain printer-specific software or printer-specific configuration information for the selected printer, and
send the printer data to the selected printer.

18. The system of claim 17, wherein the configuration to cause the system to select a print file format from the plurality of print file formats to optimize the computing device's power consumption for a print job, comprises a configuration to cause the system to select a print file format that will take the computing device less time to send the printer data to the selected printer than another of the plurality of print file formats.

19. The system of claim 17, wherein the configuration to cause the system to select a print file format from the plurality of print file formats to optimize the computing device's power consumption for a print job, comprises a configuration to cause the system to select a print file format that will result in less printer data than another of the plurality of print file formats.

20. The system of claim 17, wherein the configuration to cause the system to select a print file format from the plurality of print file formats to optimize the computing device's power consumption for a print job, comprises a configuration to cause the system to select a print file format that will result in the computing device performing fewer computational operations to generate printer data than another of the plurality of print file formats.

21. The system of claim 17, wherein the configuration to cause the system to select a print file format from the plurality of print file formats to optimize the computing device's power consumption for a print job by the system, comprises a configuration to cause the system to:
identify a print file format, from the plurality of print file formats, that is also supported by a network-based print server;
determine that use of the network-based print server to generate printer data will consume less power than generating the printer data at the system; and
select the identified print file format.

22. The system of claim 21, wherein the configuration to cause the system to generate printer data for the print job based on the selected print file format, comprises a configuration to cause the system to:
send the print job, including identification of the selected print file format, to the network-based print server over a computer network; and
receive the printer data from the network-based print server over the computer network.

* * * * *